United States Patent [19]

Ailloud et al.

[11] 4,278,500
[45] Jul. 14, 1981

[54] PRESSURIZED WATER REACTOR

[75] Inventors: Jean Ailloud, Verrières le Buisson; Marcel Monteil, Paris, both of France

[73] Assignee: Commissariat a l'Energie Atomique, Paris, France

[21] Appl. No.: 8,968

[22] Filed: Feb. 2, 1979

[30] Foreign Application Priority Data

Feb. 6, 1978 [FR] France .................................. 78 03207

[51] Int. Cl.³ ............................................. G21D 5/12
[52] U.S. Cl. ........................................ 176/37; 176/38; 176/65
[58] Field of Search .................... 176/37, 38, 65, 61, 176/54, 55, 56

[56] References Cited

U.S. PATENT DOCUMENTS

| 3,346,459 | 10/1967 | Prince | 176/61 |
|---|---|---|---|
| 3,380,889 | 4/1968 | Loose | 176/65 |
| 3,431,168 | 3/1969 | Kjemtrup | 176/55 |
| 3,625,820 | 12/1971 | Gluntz | 176/54 |
| 3,682,772 | 8/1972 | Bredtschneider | 176/65 |
| 3,748,229 | 7/1973 | Schill | 176/65 |
| 3,859,166 | 1/1975 | Flynn | 176/38 |
| 3,973,402 | 8/1976 | Silvestri | 176/65 |
| 4,099,385 | 7/1978 | Silvestri | 176/55 |

Primary Examiner—David H. Brown
Assistant Examiner—Edward F. Miles

[57] ABSTRACT

The primary coolant fluid is circulated within at least one primary loop between a steam generator and a pressure vessel. Within the steam generator, the primary fluid flows through a tube bundle and exchanges heat with a secondary fluid which is admitted in the form of water and discharged in the form of steam. After expansion within turbines and recovery in a condenser, the steam is then returned into the generator. The primary fluid circulating pumps are each driven by a turbine which is fed with steam taken directly from the steam generator or from the main outlet duct of the generator. The essential objective of the invention is to dispense with the use of an electric motor for driving each primary fluid circulating pump.

4 Claims, 3 Drawing Figures

PRESSURIZED WATER REACTOR

BACKGROUND OF THE INVENTION

The present invention relates to nuclear reactors, especially of the pressurized water type in which the reactor core coolant fluid or so-called primary fluid circulates under the action of a circulating pump within at least one primary loop between a steam generator and a pressure vessel which contains the reactor core. The steam generator comprises a bundle of tubes through which the primary fluid is circulated and exchanges heat with a secondary fluid usually consisting of water which enters the generator in the liquid state and is discharged therefrom in the form of steam. After expansion within turbines and recovery in a condenser, the steam is then returned into the generator.

In order to carry out the circulation of primary fluid under pressure, each primary loop usually comprises a pump driven by an electric motor at a constant speed. However, this conventional solution is subject to a number of disadvantages, in the first place during normal operation by reason of the lack of flexibility of the motor-pump assembly and in the second place when certain fault conditions arise. Despite the presence of a substantial safety margin, it proves difficult under such conditions to maintain sufficient cooling of the reactor until the moment when the emergency systems provided can come into action.

The present invention relates to an improvement in pressurized water reactors of the type mentioned above. The essential aim of the improvement is to dispense with the use of an electric motor for driving the primary fluid circulating pump and consequently to overcome the disadvantages mentioned above. The arrangements which are contemplated permit direct utilization of the power available in the secondary fluid circuit in order to drive said pump and also to ensure operation of essential emergency devices in the event of failure or operating incidents in the primary circuit.

To this end, the improvements under consideration are essentially distinguished by the fact that the primary fluid circulating pump is driven by a turbine supplied with steam taken directly from the steam generator or from a main duct through which the steam is discharged from said generator. The turbine outlet is connected to the feedwater tank of the water unit of the main turbine by means of a pipe provided with isolating valves and a bypass pipe. In the event of closure of said isolating valves, said bypass pipe permits a flow of steam which is capable of driving an auxiliary turbine. A pump driven by the turbine serves to inject emergnecy water at high pressure into the primary circuit from a storage tank and discharge then takes place directly within the containment vessel.

In accordance with yet another distinctive feature and in the event of tripping of the main turbine, the feedwater tank is adapted to receive part of the main steam flow discharged from the generator. The secondary water under pressure of the tank can in this case be employed in two different ways. Thus in one case it can be returned directly into the steam generator via the emergency feed circuit of this latter and can continue to contribute to the production of steam which is necessary for operation of the primary turbo-pump; this procedure remains practicable even during the first stage of a primary circuit accident which has resulted in isolation of the exit steam lines from the containment vessel. Alternatively, said secondary water can be utilized as driving fluid for a secondary water injector and obtained from a storage tank within at least one steam generator and for at least one primary water injector of the emergency low-pressure injection circuit; this procedure can be adopted in the second stage of an accidental sequence of the primary circuit after the emergency high-pressure injection pumps have ceased to operate.

For the purpose of starting-up the primary pumps, the primary turbo-pumps can be supplied at a very low rate of flow by the steam derived from an auxiliary generating unit in accordance with the arrangements made for general reheating of the installation, the supply being effected by means of an auxiliary pipe having a very small diameter.

As an advantageous feature, the turbine for driving the primary fluid circulating pump is of the back-pressure type and comprises a regulating valve having at least two positions: one position permits a minimum flow of steam whilst the other position permits the normal flow with automatic return to the first position in the event of overstepping of a predetermined threshold. This valve can also serve to regulate the intake flow to the turbine between these two extremes and thus to vary the speed of the pump in a continuous manner.

BRIEF DESCRIPTION OF THE DRAWING

Further distinctive properties of the improvements contemplated by the invention and applied more especially to the primary fluid circulation loop of a pressurized water reactor in heat-exchange relation with a secondary fluid within a steam generator will become apparent from the following description of one exemplified embodiment which is given by way of indication without any limitation being implied, reference being made to the accompanying drawings, wherein.

DETAILED DESCRIPTION OF A PREFERRED EMBODIMENT

Figure 1:
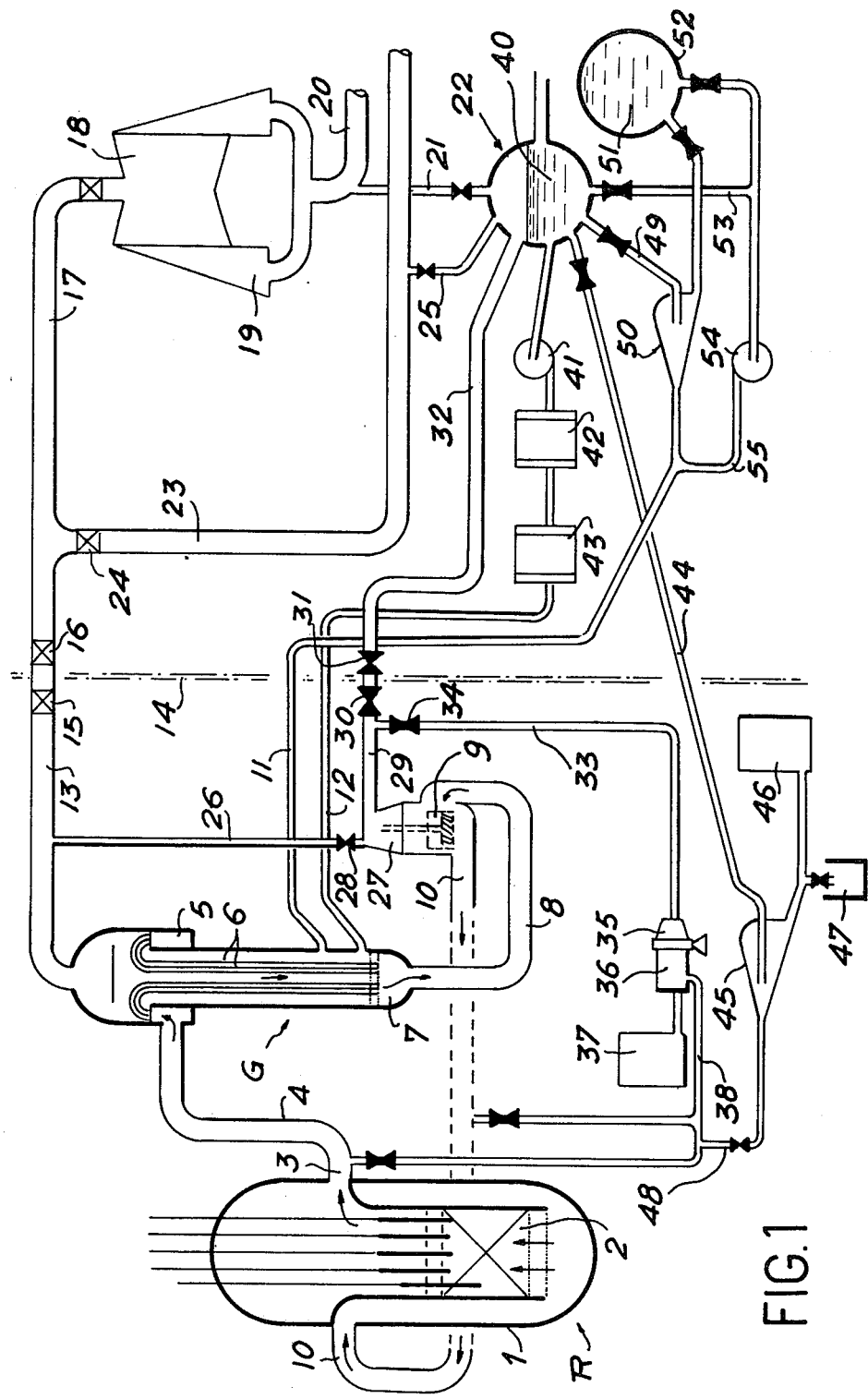
FIG. 1 is a diagrammatic view of a primary loop of a pressurized water reactor endowed with the improvements under consideration.

The diagram of FIG. 1 illustrates in particular the pressure vessel 1 of a pressurized water reactor, the reactor core being placed within the pressure vessel and shown very diagrammatically. A primary coolant fluid for removal of the heat generated by nuclear fission within the reactor core circulates within a series of primary loops 3 which are spaced at intervals around the pressure vessel 1 and only one of which is shown in the figure. A primary loop 3 comprises in particular an outlet duct 4 connected to an inlet header 5 for the admission of primary fluid into a steam generator G. Within said header, the primary fluid is distributed to the upper ends of the tubes of a bundle 6 which extends downwards through the generator and opens into an outlet header 7 at the lower ends of the tubes. At the exit of said outlet header, the primary fluid is collected by a duct 8 and drawn up by a pump 9, then returned at a suitable pressure into a duct 10 which is connected to the pressure vessel 1, thus permitting of continuous circulation of the primary fluid.

The secondary fluid which usually consists of water is fed in the liquid state to the bottom of the steam generator G and circulated in contact with the tube bundle 6 by means of two pipes 11 and 12, this feed system being described hereinafter in greater detail. The water in the liquid state rises within the steam generator in contact with the tubes 6 and vaporizes before being discharged in the form of live steam at the upper end of the generator through a duct 13. Said duct 13 extends through the wall 14 of an enclosure which is shown diagrammatically and so designed as to provide containment of the primary circuit. Penetration of the enclosure wall 14 by the duct 13 is effected by means of two isolating valves 15 and 16 respectively. On the other side of the wall, the duct 13 has an extension constituted by a duct 17 through which the steam delivered by the generator is fed into the cylinder of a high-pressure turbine 18. The steam is expanded and then collected at the outlet 19 of said turbine before being sent through a duct 20 to another low-pressure turbine (not shown in the drawings). A bleeder pipe 21 also serves to return part of the steam to a feed tank 22. A duct 23 which passes around the high-pressure turbine 18 is provided with an isolating valve 24 and is also connected to the feed tank 22 by means of a second bleeder pipe 25. These ducts are fitted with regulating devices and valves which have not been illustrated in the drawings.

A pipe 26 is mounted as a bypass off the outlet duct 13 or connected directly to the generator G and serves to effect a suitable withdrawal from the steam flow. Said bypass pipe 26 feeds an auxiliary back-pressure turbine 27 through a regulating valve 28 having at least two positions. The steam expanded at the outlet of said turbine 27 is returned through a duct 29 which extends after passing through two isolating valves 30 and 31 on each side of the wall 14 into a pipe 32 which is again connected to the feed tank 22. The regulating valve 28 can advantageously be associated with a system of flow-modulating valves (not shown) which permit of continuous load variations between minimum output and rated output. It is apparent that the auxiliary turbine 27 is provided with the usual safety systems for restoring the speed of the turbine on load to a value of the order of 300 to 400 rpm in the event of overstepping, whereas the normal speed of the turbine is 3000 rpm, for example.

Within the enclosure 14, another pipe 33 is branched on the duct 29 and provided with a control valve 34. Thus in the event of closure of the isolating valves 30 and 31 and opening of said control valve 34, a minimum flow of steam can be passed to a second auxiliary turbine 35 which drives an emergency pump 36. By means of said pump, water containing boric acid, for example, is pumped from a storage tank 37 into the reactor vessel 1 via a pipe 38 which is connected to the ducts 4 and 10 of the primary circuit.

It is apparent that, by virtue of these arrangements, the circulating pump 9 provided within the primary circuit is driven directly by the auxiliary turbine 27 under normal operating conditions. Thus the entire quantity of energy which is necessary is directly extracted from the secondary circuit, thereby dispensing with the need for an electric motor or the like. At the same time, the regulating valve 28 ensures self-regulation of the turbine drive flow rate so that the minimum flow rate corresponding to the first valve-opening position still ensures suitable operation of the circulating pump at low operating speeds.

In the event of an accident condition in the primary circuit and specifically in one of the ducts 10 or 4 for feeding or discharging primary fluid to or from the pressure vessel 1, the invention makes it possible to keep the primary pumps of umdamaged loops in operation and also to maintain the emergency high-pressure injection pumps in operation. To this end, since the closure of the isolating valves 30 and 31 has caused the control valve 34 to open, the emergency pump 36 driven by the turbine 35 draws the water containing boric acid from the tank 37 and discharges it through the pipe 38 to the ducts 4 and 10 and thence to the interior of the pressure vessel.

It is worthy of note that the low-pressure injection of emergency boric acid solution into the primary circuit through the pipe 48 can also be carried out from a storage tank 46 or from a sump 47 by means of the water under pressure 40 contained in the tank 22 and utilized as driving fluid within an injector 45 to which it is fed through a pipe 44.

Under normal operating conditions, the water 40 under pressure is returned by a turbo-pump 41 through reheaters 42 and 43 and thence to the pipe 12. However, said water can be passed through a pipe 49 to a second injector 50 in order to serve as driving fluid for an emergency supply of secondary fluid to the steam generator G via the pipe 11, this emergency supply being obtained from a storage tank 52. It should be mentioned that, in the case of at least one of the steam generators, said injector 50 duplicates the normal auxiliary feed circuit of said steam generator, namely the circuit comprising the pipes 53 and 55 and the auxiliary pump 54.

Figure 2:
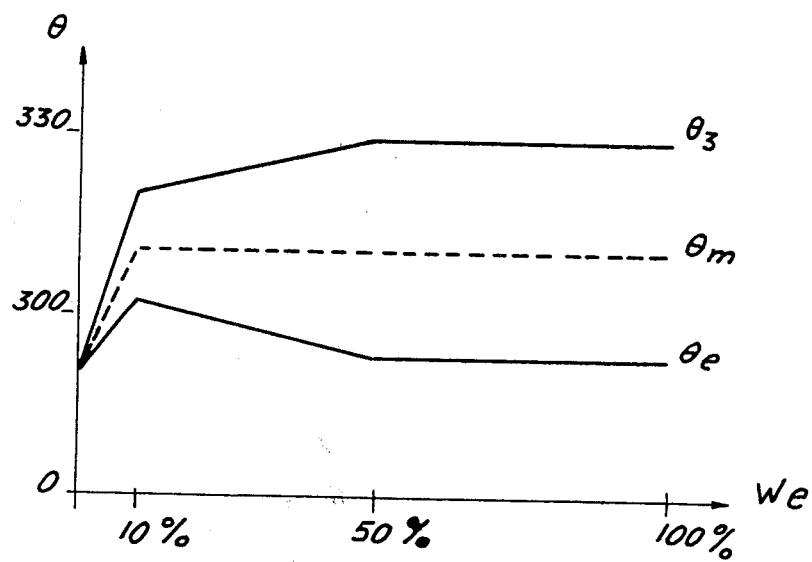
FIGS. 2 and 3 are diagrams which give the power extracted from the circuit by the primary turbo-pumps as a function of possible characteristics of the primary fluid.
Figure 3:
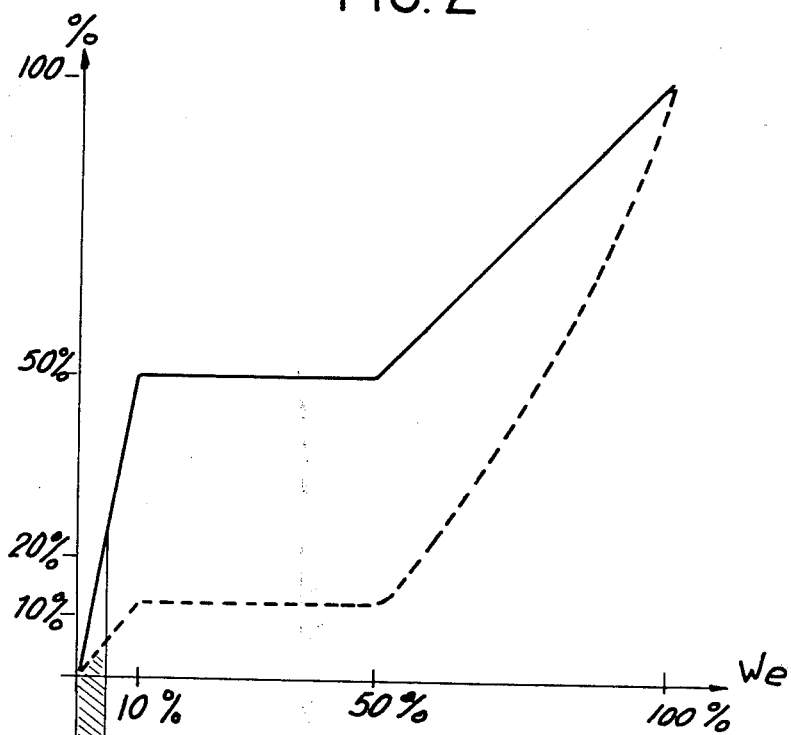

The two diagrams illustrated in FIGS. 2 and 3 define the possible characteristics of the primary fluid for a pressurized light-water reactor comprising a system of the type described in the foregoing, the turbine which actuates the primary pump in said system being provided with a steam flow regulating valve of the aforementioned type. The diagram of FIG. 2 indicates the variations in primary fluid temperature as a function of the electric power required whilst the diagram of FIG. 3 gives the percentage of the primary circuit output and the relative power absorbed by the circulating pump, as a function of the load.

Provision is thus made for an improved device for supplying steam to turbines which drive the primary fluid circulating pumps. The general arrangement of this device achieves a remarkable increase in flexibility of operation and reliability of the installation. From a safety standpoint, the invention also represents a substantial improvement by virtue of the fact that, as long as the reactor produces power, the cooling system utilizes this power for cooling the reactor; in addition, the reactor power is directly utilized for initiating the high-pressure emergency injection with delayed action and partly contributing to subsequent cooling of the reactor by means of static devices. An intrinsic safety system is thus provided for all incidents which are liable to occur in the primary circuit, even in the event of failure of external electrical supplies.

We claim:

1. A pressurized water reactor comprising: a primary fluid circuit, at least one circulating pump for circulating primary fluid within at least one primary loop of said primary circuit, said primary circuit including a steam generator, a pressure vessel which contains a reactor core, and a bundle of tubes in said steam generator, a secondary fluid circuit containing fluid which enters the steam generator in a liquid state and is discharged therefrom in the form of steam which is returned into the generator after expansion within main turbines and recovery in a condenser, said primary circuit including a driving turbine supplied with steam taken from the steam generator, and fluid circulating pumps each driven by said driving turbine, a feed tank of a water supply unit, an auxiliary turbine, a storage tank and a pump drivingly connected to said auxiliary turbine, each main turbine having an outlet connected to said feed tank by means of conduit means provided with isolating valves and by means of bypass conduit means, for permitting a flow of steam for driving said auxiliary turbine in the event of closure of said isolating valves, and means for injecting high-pressure emergency water into said primary circuit from said storage tank by means of said pump.

2. A pressurized water reactor according to claim 1, comprising at least two injectors, means for passing water under pressure in said feed tank in the event of failure of the primary circuit into said injectors to perform the function of a driving fluid within said injectors, driven fluid within one injector being water derived from a storage tank of a low-pressure safety injection circuit, and driven fluid within the second injector being secondary water derived from a storage tank and fed into an emergency feed circuit of one of the steam generators.

3. A pressurized water reactor according to claim 1, comprising at least two injectors, means for passing water under pressure in said feed tank in the event of failure of the primary circuit into said injectors to perform the function of a driving fluid within said injectors, driven fluid within one injector being primary water in a sump to be recycled to the reactor core, and driven fluid within the second injector being secondary water derived from a storage tank and fed into an emergency feed circuit of one of the steam generators.

4. A pressurized water reactor according to claim 1, wherein the turbine for driving the primary fluid circulating pump is of the back-pressure type and comprises a regulating valve having at least two positions such that a first of said positions permits a minimum flow of steam while a second position permits a normal flow, means being provided for automatically returning the regulating valve to the first position when in the second position in the event of overstepping of a predetermined threshold.

* * * * *